United States Patent
Wu et al.

(10) Patent No.: US 9,653,920 B2
(45) Date of Patent: May 16, 2017

(54) METHOD FOR CALCULATING CONTINUATION POWER FLOW OF ELECTRIC POWER SYSTEM

(71) Applicant: Tsinghua University, Beijing (CN)

(72) Inventors: Wenchuan Wu, Beijing (CN); Boming Zhang, Beijing (CN); Hongbin Sun, Beijing (CN); Qinglai Guo, Beijing (CN); Yuntao Ju, Beijing (CN)

(73) Assignee: Tsinghua University, Beijing (CN)

( * ) Notice: Subject to any disclaimer, the term of this patent is extended or adjusted under 35 U.S.C. 154(b) by 599 days.

(21) Appl. No.: 14/174,114

(22) Filed: Feb. 6, 2014

(65) Prior Publication Data

US 2014/0222227 A1   Aug. 7, 2014

(30) Foreign Application Priority Data

Feb. 6, 2013   (CN) .......................... 2013 1 0046963

(51) Int. Cl.
   *G05B 15/02*      (2006.01)
   *H02J 3/06*       (2006.01)

(52) U.S. Cl.
   CPC ..................................... *H02J 3/06* (2013.01)

(58) Field of Classification Search
   None
   See application file for complete search history.

(56) References Cited

U.S. PATENT DOCUMENTS

| 5,745,368 A | * | 4/1998 | Ejebe | H02J 3/00 307/102 |
| 5,796,628 A | * | 8/1998 | Chiang | H02J 3/14 307/29 |

OTHER PUBLICATIONS

Yu, Yuntao et al., Continuation Power Flow Based on a Novel Local Geometric Parameterisation Approach, IET Gener. Transm. Distrib., 2014, vol. 8, Iss. 5, pp. 811-818.

* cited by examiner

*Primary Examiner* — Umut Onat
(74) *Attorney, Agent, or Firm* — Lathrop & Gage LLP

(57) ABSTRACT

A method for obtaining a continuous power flow of an electric power system is provided. The method uses the bus having the fastest voltage drop as the local parameterization bus, defines a slope of a line determined by the voltage of the geometric parameterization bus and the load growth factor as the parameterization variable, and adds a one-dimensional geometric parameterization constraint equation near turning points to obtain a nonsingular extended power flow equation, such that the continuation power flow can cross the turning points and a continuous P-V curve can be drawn reliably.

7 Claims, 2 Drawing Sheets

METHOD FOR CALCULATING CONTINUATION POWER FLOW OF ELECTRIC POWER SYSTEM

CROSS-REFERENCE TO RELATED APPLICATION

This application claims priority to and benefits of Chinese Patent Application Serial No. 201310046963.0, filed with the State Intellectual Property Office of P. R. China on Feb. 6, 2013, the entire content of which is incorporated herein by reference.

FIELD

Embodiments of the present disclosure generally relate to an automatic scheduling of an electric power system, and more particularly to a method for calculating a continuation power flow of an electric power system.

BACKGROUND

A continuation power flow is an important tool for evaluating the voltage stability of electric power systems. The purpose of calculating the continuation power flow is to solve the maximum load margin of electric power system. The P-V curve obtained from the result of calculating the continuation power flow can provide information about the voltage stability and the voltage stability margin of the electric power system.

The parameterization technique is the key for continuation power flow. Conventional parameterization techniques include a local parameterization method and a global parameterization method. The local parameterization method may fail in calculating the power flow on some non-turning points and the global parameterization method may fail in calculating the power flow on turning points. Thus, it is important to propose a robust method for calculating the continuation power flow of the electric power system.

SUMMARY

Embodiments of the present disclosure seek to solve at least one of the problems existing in the prior art to at least some extent.

One objective of the present disclosure is to provide a method for calculating a continuation power flow of an electric power system, which can reliably draw the P-V curve without the need of a forced parameter-switching strategy and a special method for controlling step-lengths, and has a better robustness.

According to embodiments of the present disclosure, a method for calculating a continuation power flow of an electric power system is provided. The method comprises steps of: establishing a first power flow equation for each of a plurality of PQ buses to obtain a plurality of first power flow equations, and establishing a second power flow equation for each of a plurality of PV buses to obtain a plurality of second power flow equations, in which the PV bus is a bus having a known injected active power and a known voltage magnitude, the PQ bus is a bus having a known injected active power and a known injected reactive power; establishing a group of power flow equations according to the plurality of first flow equations, the plurality of second power flow equations, and a voltage magnitude and a voltage phase of a balance bus; choosing a bus having a fastest voltage drop as a parameterization bus, and defining a parameterization variable according to a voltage magnitude of the parameterization bus; defining an equality constraint equation according to the parameterization variable, and generating an extended power flow equation according to the equality constraint equation and the group of power flow equations; solving the extended power flow equation by a plurality of iterations to obtain a plurality of load summations; and generating a P-V curve according to the plurality of load summations.

In one embodiment of the present disclosure, the first power flow equation is:

$$\begin{cases} P_i = V_i^2 G_{ii} + \sum_{j \in i}^{j \neq i} V_i V_j (G_{ij}\cos\theta_{ij} + B_{ij}\sin\theta_{ij}) \\ Q_i = -V_i^2 B_{ii} + \sum_{j \in i}^{j \neq i} V_i V_j (G_{ij}\sin\theta_{ij} - B_{ij}\cos\theta_{ij}); \end{cases}$$

and the second power flow equation is:

$$\begin{cases} P_m = V_m^2 G_{mn} + \sum_{n \in m}^{n \neq m} V_m V_n (G_{mn}\cos\theta_{mn} + B_{mn}\sin\theta_{mn}) \\ V_m = V_m, \end{cases}$$

where, $P_i$ is the injected active power of a $i^{th}$ bus, $Q_i$ is the injected reactive power of the $i^{th}$ bus, $V_i$ is the voltage magnitude of the $i^{th}$ bus, $\theta_{ij}$ is a voltage phase difference between the $i^{th}$ bus and a $j^{th}$ bus, $G_{ii}$ is a real part of a $i^{th}$ diagonal element in a bus admittance matrix, $B_{ii}$ is an imaginary part of the $i^{th}$ diagonal element in the bus admittance matrix, $G_{ij}$ is an real part of an element at a $i^{th}$ row and a $j^{th}$ column of the bus admittance matrix, $B_{ij}$ is an imaginary part of the element at the $i^{th}$ row and the $j^{th}$ column of the bus admittance matrix, j∈i represents that there is a branch between the $i^{th}$ bus and the $j^{th}$ bus; and where, $P_i = P_{Gi}^0 + P_{Li}^0 + \lambda(P_{Gi}^S + \gamma_i P_{Li}^S)$, $Q_i = Q_{Li}^0 + \lambda Q_{Li}^S$, $P_{Gi}^0$ is an initial active power vector of a generator, $P_{Li}^0$ is an initial active power of a load at the $i^{th}$ bus, $Q_{Li}^0$ is an initial reactive power of the load at the $i^{th}$ bus, $P_{Gi}^S$ is a power growth direction of the generator, $P_{Li}^S$ is an active power growth direction of the load at the $i^{th}$ bus, $Q_{Li}^S$ is a reactive power growth direction of the load at the $i^{th}$ bus, $\gamma_i$ is a loss allocation factor of the generator at the $i^{th}$ bus, $\lambda$ is a load growth factor and R is a real number set.

In one embodiment of the present disclosure, the group of flow power equations is simplified to be: $f(x,\lambda)=0$, where, x is the voltage magnitude and the voltage phase of buses in the electric power system.

In one embodiment of the present disclosure, the parameterization variable is defined as $$t_\beta^k = \tan\beta^k = \frac{\lambda^k - \lambda^0}{V_l^k - V_l^0} = \frac{\lambda^k}{V_l^k - V_l^0},$$

where, $(V_l^0, \lambda^0)$ is a base power flow solution, $(V_l^k, \lambda^k)$ is the $k^{th}$ continuation power flow solution, $V_l^k$ is the voltage magnitude of the bus l having the fastest voltage drop in the $k^{th}$ continuation power flow solution, and $\beta$ is an angle between an auxiliary line determined by points $(V_l^k, \lambda^k), (V_l^0, \lambda^0)$ and the vertical axis.

In one embodiment of the present disclosure, the parameterization variable $t_\beta^k$ meets a following relation: $t_\beta^k = t_\beta^{k-1} + \Delta t_\beta$, where, $t_\beta^{k-1}$ is the parameterization variable in the $(k-1)^{th}$ iteration, $t_\beta^k$ is the parameterization variable in the $k^{th}$ iteration, and $$\Delta t_\beta = \frac{\lambda^1}{N(V_l^0 - V_l^1)}$$

is a growth step of the parameterization variable $t_\beta$.

In one embodiment of the present disclosure, the extended power flow equations are defined as:

$$\begin{cases} f(x, \lambda) = 0 \\ h(V_l, \lambda) = t_\beta^k(V_l - V_0) - \lambda = 0, \end{cases}$$

where, $h(V_l, \lambda) = 0$ is the equality constraint equation.

In one embodiment of the present disclosure, the extended power flow equation is solved by a Newton method and a following iteration equations are used during solving the extended power flow equations:

$$\begin{bmatrix} f'_x & f'_\lambda \\ t_\beta^k e_l^T & -1 \end{bmatrix} \begin{bmatrix} \Delta x \\ \Delta \lambda \end{bmatrix} = - \begin{bmatrix} f(x, \lambda) \\ h(x, \lambda) \end{bmatrix},$$

where, $e_l^T$ is a column vector, an $l^{th}$ element of $e_l^T$ is 1, and other elements of $e_l^T$ is 0.

In one embodiment of the present disclosure, the iteration is stopped when the load growth factor $\lambda$ is less than or equal to 0.

With the method according to embodiments of the present disclosure, by using the bus having the fastest voltage drop as the local parameterization bus, by defining a slope of a line determined by the voltage of the geometric parameterization bus and the load growth factor as the parameterization variable, and by adding a one-dimensional geometric parameterization constraint equation near turning points to obtain a nonsingular extended power flow equation, the continuation power flow can cross the turning points and a continuous P-V curve can be drawn reliably.

The method according to embodiments of the present disclosure has following advantages.

(1) The method of the present disclosure is simple in controlling step-lengths, such that a convergence problem caused by a too large step-length will not appear. Moreover, the method of the present disclosure has a characteristic of an intensive distribution of solution points near turning points, which is advantageous for drawing the curve near the turning points accurately.

(2) Compared with conventional methods which need to perform an attempt and a switching between a horizontal correction and a vertical correction to ensure a convergence of the calculation, the method according to embodiments of the present disclosure does not need to switch parameterization logic.

(3) The method of the present disclosure is efficient and robust, thus being suitable for an online application of a large power grid.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
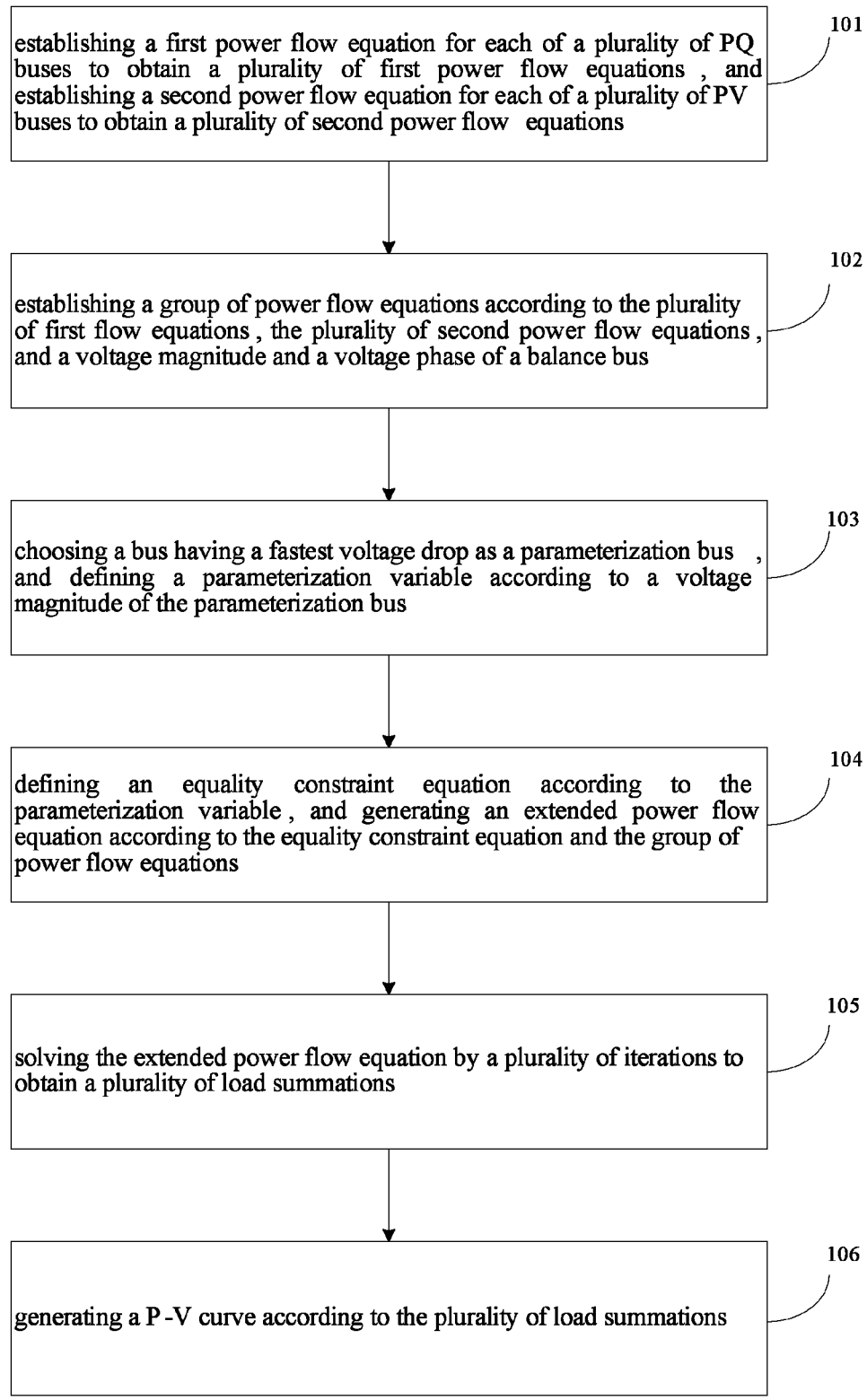
FIG. 1 is a flow chart of a method for calculating a continuation power flow of an electric power system according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

It is to be understood that phraseology and terminology used herein (such as, terms like "center", "longitudinal", "lateral", "length", "width", "thickness", "up", "down", "front", "rear", "left", "right", "top", "bottom", "inside", "outside", "vertical", "horizontal", "clockwise" and "counterclockwise") are only used to simplify description of the present invention, and do not indicate or imply that the device or element referred to must have or operated in a particular orientation. They cannot be seen as limits to the present disclosure.

It is to be understood that, in the description of the present disclosure, terms of "first" and "second" are only used for description and cannot be seen as indicating or implying relative importance. Unless otherwise stipulated and restricted, it is to be explained that terms of "linkage" and "connection" shall be understood broadly, for example, it could be mechanical connection or electrical connection; it could be direct linkage, indirect linkage via intermediate medium. Those skilled in the art shall understand the concrete notations of the terms mentioned above according to specific circumstances. Furthermore, unless otherwise explained, it is to be understood that a term of "a plurality of" refers to two or more.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. These and other aspects should be understood by those skilled in the art with reference to the following description and drawings. In these description and drawings, some particular implementations of the present disclosure are disclosed to present some ways for implementing the principle of the present disclosure. However, it should be understood that embodiments of the present disclosure is not limited to this. Contrarily, embodiments of the present disclosure include all the variations, modifications and equivalents within the spirit and scope of the appended claims.

In the following, a method for calculating a continuation power flow of an electric power system according to embodiments of the present disclosure will be described in detail with reference to drawings.

FIG. 1 is a flow chart of a method for calculating a continuation power flow of an electric power system according to an embodiment of the present disclosure. As shown in FIG. 1, the method comprises the following steps.

At step 101, a first power flow equation is established for each of a plurality of PQ buses to obtain a plurality of first power flow equations, and a second power flow equation is established for each of a plurality of PV buses to obtain a plurality of second power flow equations. The PV bus is a bus having a known injected active power and a known voltage magnitude, the PQ bus is a bus having a known injected active power and a known injected reactive power.

In one embodiment of the present disclosure, the first power flow equation is:

$$\begin{cases} P_i = V_i^2 G_{ii} + \sum_{j \in i}^{j \neq i} V_i V_j (G_{ij} \cos\theta_{ij} + B_{ij} \sin\theta_{ij}) \\ Q_i = -V_i^2 B_{ii} + \sum_{j \in i}^{j \neq i} V_i V_j (G_{ij} \sin\theta_{ij} - B_{ij} \cos\theta_{ij}); \end{cases}$$

and
the second power flow equation is:

$$\begin{cases} P_m = V_m^2 G_{mn} + \sum_{n \in m}^{n \neq m} V_m V_n (G_{mn} \cos\theta_{mn} + B_{mn} \sin\theta_{mn}) \\ V_m = V_m, \end{cases}$$

where, $P_i$ is the injected active power of a $i^{th}$ bus, $Q_i$ is the injected reactive power of the $i^{th}$ bus, $V_i$ is the voltage magnitude of the $i^{th}$ bus, $\theta_{ij}$ is a voltage phase difference between the $i^{th}$ bus and a $j^{th}$ bus, $G_{ii}$ is a real part of a $i^{th}$ diagonal element in a bus admittance matrix, $B_{ii}$ is an imaginary part of the $i^{th}$ diagonal element in the bus admittance matrix, $G_{ij}$ is an real part of an element at a $i^{th}$ row and a $j^{th}$ column of the bus admittance matrix, $B_{ij}$ is an imaginary part of the element at the $i^{th}$ row and the $j^{th}$ column of the bus admittance matrix, j∈i represents that there is a branch between the $i^{th}$ bus and the $j^{th}$ bus.

Further, $P_i = P_{Gi}^0 + P_{Li}^0 + \lambda(P_{Gi}^S + \gamma_i P_{Li}^S)$, $Q_i = Q_{Li}^0 + \lambda Q_{Li}^S$, where $P_{Gi}^0$ is an initial active power vector of a generator, $P_{Li}^0$ is an initial active power of a load at the $i^{th}$ bus, $Q_{Li}^0$ is an initial reactive power of the load at the $i^{th}$ bus, $P_{Gi}^S$ is a power growth direction of the generator, $P_{Li}^S$ is an active power growth direction of the load at the $i^{th}$ bus, $Q_{Li}^S$ is a reactive power growth direction of the load at the $i^{th}$ bus, $\gamma_i$ is a loss allocation factor of the generator at the $i^{th}$ bus, $\lambda$ is a load growth factor and R is a real number set.

At step 102, a group of power flow equations are established according to the plurality of first flow equations, the plurality of second power flow equations, and a voltage magnitude and a voltage phase of a balance bus.

In one embodiment of the present disclosure, the group of flow power equations is simplified to be $f(x,\lambda)=0$, where x is the voltage magnitude and the voltage phase of a bus in the electric power system.

At step 103, a bus having a fastest voltage drop is chosen as a parameterization bus, and a parameterization variable is defined according to a voltage magnitude of the parameterization bus.

In one embodiment of the present disclosure, the parameterization variable is defined as $$t_\beta^k = \tan\beta^k = \frac{\lambda^k - \lambda^0}{V_l^k - V_l^0} = \frac{\lambda^k}{V_l^k - V_l^0},$$

where, $(V_l^0, \lambda^0)$ is a base power flow solution, $(V_l^k, \lambda^k)$ is the $k^{th}$ continuation power flow solution, $V_l^k$ is the voltage magnitude of the bus l having the fastest voltage drop in the $k^{th}$ continuation power flow solution, and β is an angle between an auxiliary line determined by points $(V_l^k, \lambda^k), (V_l^0, \lambda^0)$ and the vertical axis.

In one embodiment of the present disclosure, the parameterization variable $t_\beta^k$ meets a following relation:

$$t_\beta^k = t_\beta^{k-1} + \Delta t_\beta,$$

where, $t_\beta^{k-1}$ is the parameterization variable in the $(k-1)^{th}$ iteration, $t_\beta^k$ is the parameterization variable in the $k^{th}$ iteration, and $$\Delta t_\beta = \frac{\lambda^1}{N(V_l^0 - V_l^1)}$$

is a growth step of the parameterization variable $t_\beta$.

At step 104, an equality constraint equation is defined according to the parameterization variable, and an extended power flow equation is generated according to the equality constraint equation and the group of power flow equations.

In one embodiment of the present disclosure, the extended power flow equations are defined as:

$$\begin{cases} f(x, \lambda) = 0 \\ h(V_l, \lambda) = t_\beta^k (V_l - V_0) - \lambda = 0, \end{cases}$$

where, $h(V_l, \lambda) = 0$ is the equality constraint equation.

At step 105, the extended power flow equation is solved by a plurality of iterations to obtain a plurality of load summations.

In one embodiment of the present disclosure, the extended power flow equations are solved by a Newton method and a following iteration equation is used during solving the extended power flow equations:

$$\begin{bmatrix} f_x' & f_\lambda' \\ t_\beta^k e_l^T & -1 \end{bmatrix} \begin{bmatrix} \Delta x \\ \Delta \lambda \end{bmatrix} = -\begin{bmatrix} f(x, \lambda) \\ h(x, \lambda) \end{bmatrix},$$

where, $e_l^T$ is a column vector, an $l^{th}$ element of $e_l^T$ is 1, and other elements of $e_l^T$ is 0. The iteration is stopped when the load growth factor λ is less than or equal to 0.

At step 106, a P-V curve is generated according to the plurality of load summations.

In one embodiment of the present disclosure, the iteration is stopped when the load growth factor λ is less than or equal to 0.

With the method according to embodiments of the present disclosure, by using the bus having the fastest voltage drop as the parameterization bus, by defining a slope of a line determined by the voltage of the parameterization bus and the load growth factor as the parameterization variable, and by adding a one-dimensional local geometric parameterization constraint equation near turning points to obtain a nonsingular extended power flow equation, the continuation power flow can cross the turning points and a continuous P-V curve can be drawn reliably.

Figure 2:
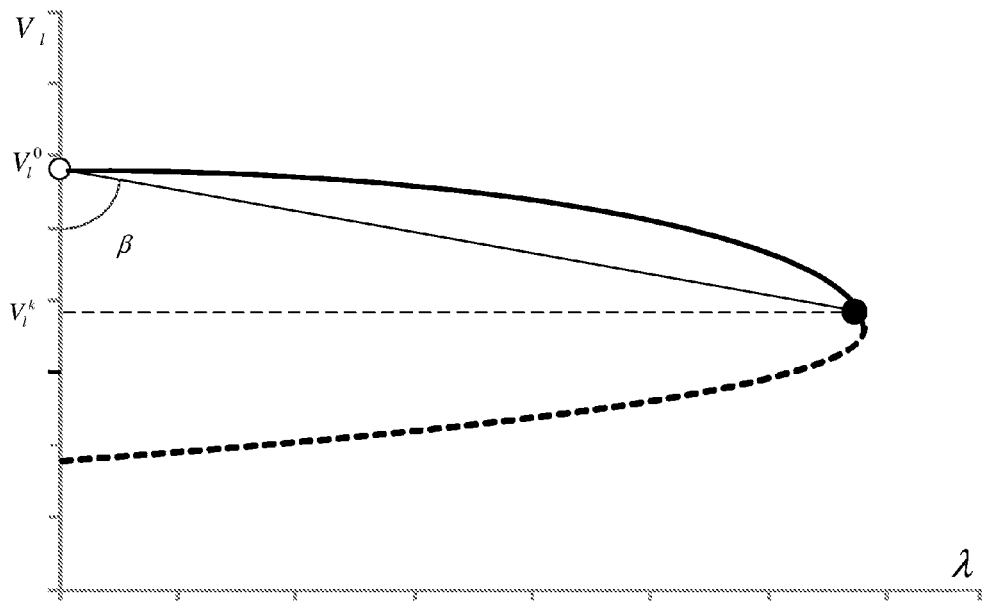
FIG. 2 is a schematic diagram of a P-V curve and a parameterization variable $t_\beta$ according to an embodiment of the present disclosure.

FIG. 2 is a schematic diagram of a P-V curve and a parameterization variable $t_\beta$ according to an embodiment of the present disclosure. As shown in FIG. 1, the horizontal axis represents the load growth factor λ, the vertical axis represents the voltage magnitude of a bus, the solid line section of the P-V curve represents the result of the conventional power flow calculation method and the imaginary line section of the P-V curve represents the result of the local geometric parameterization calculation method.

In the following, IEEE14 bus system is taken as an example to describe the method according to embodiments of the present disclosure. The convergence criterion of the continuation power flow calculation is unified to be $\|\Delta x\|_\infty < 10^{-5}$. The growth directions of all the load buses and the generator buses are 0.1 times of the base state power.

At the initial phase, a conventional power flow calculation algorithm is used to calculate the power flow result after the load factor grows, and then the power flow is calculated by using the local geometric parameterization method when the iteration times during the conventional power flow calculation algorithm is more than 20.

In this example, the bus 5 having the fastest voltage drop is chosen as the parameterization bus, and the parameter N in the formula for calculating $\Delta t_\beta$ is set to be 25. Thus, the parameterization variation $t_\beta^k$ can be obtained according to the above formulas. The parameterization variation $t_\beta^k$ grows continually, and the calculation is stopped until λ is less than or equal to 0. Thus, the P-V curve of the electric power system can be drawn according to the calculation result.

Figure 3:
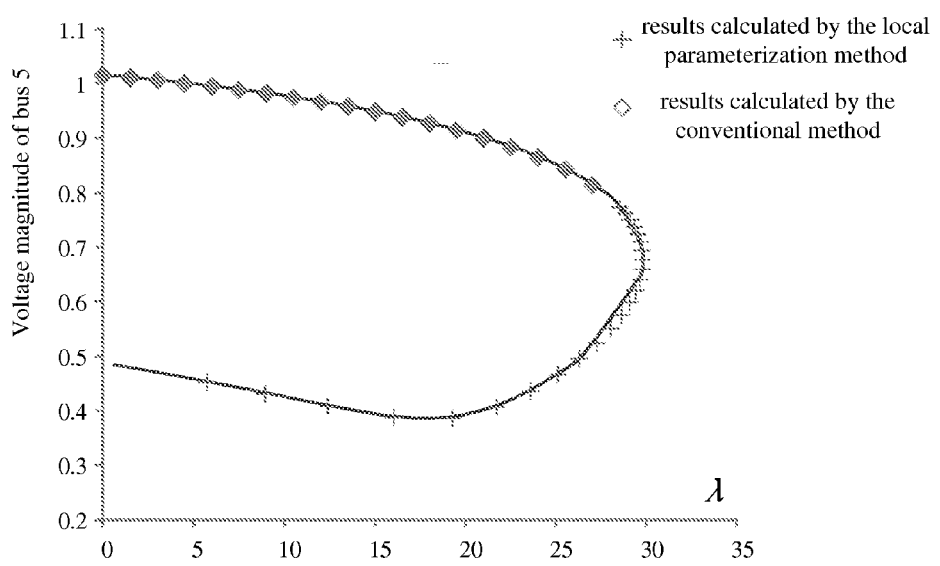
FIG. 3 is a schematic diagram of a continuation power flow of an electric power system according to an embodiment of the present disclosure.

FIG. 3 is a schematic diagram of a continuation power flow (the P-V curve) of the electric power system according to the above example of the present disclosure, in which the horizontal axis represents the load growth factor λ, and the vertical axis represents the voltage magnitude of the bus 5. As shown in FIG. 3, the local geometric parameterization method can calculate the maximum load margin of the electric power system, and the distribution of the result calculated by the geometric parameterization method is reasonable when equal step-lengths are used for calculation.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented method for calculating a continuation power flow of an electric power system, comprising:

establishing by a computer a first power flow equation for each of a plurality of PQ buses to obtain a plurality of first power flow equations, and establishing by the computer a second power flow equation for each of a plurality of PV buses to obtain a plurality of second power flow equations, wherein a PV bus is a bus having an known injected active power and a known voltage magnitude, a PQ bus is a bus having a known injected active power and a known injected reactive power;

establishing by the computer a group of power flow equations according to the plurality of first power flow equations, the plurality of second power flow equations, a voltage magnitude of a balance bus and a voltage phase of the balance bus;

choosing by the computer a bus having a fastest voltage drop as a parameterization bus, and defining a parameterization variable according to a voltage magnitude of the parameterization bus and a load growth factor;

defining by the computer an equality constraint equation according to the parameterization variable, and generating by the computer a collection of extended power flow equations according to the equality constraint equation and the group of power flow equations;

solving by the computer the collection of extended power flow equations by a plurality of iterations to obtain a plurality of load summations; and generating by the computer a Power-Voltage (P-V) curve according to the plurality of load summations, wherein the first power flow equation is:

$$\begin{cases} P_i = V_i^2 G_{ii} + \sum_{j \in i}^{j \neq i} V_i V_j (G_{ij}\cos\theta_{ij} + B_{ij}\sin\theta_{ij}) \\ Q_i = -V_i^2 B_{ii} + \sum_{j \in i}^{j \neq i} V_i V_j (G_{ij}\sin\theta_{ij} - B_{ij}\cos\theta_{ij}) \end{cases} ; \text{ and}$$

wherein the second power flow equation is:

$$\begin{cases} P_m = V_m^2 G_{mn} + \sum_{n \in m}^{n \neq m} V_m V_n (G_{mn}\cos\theta_{mn} + B_{mn}\sin\theta_{mn}) \\ V_m = V_m, \end{cases}$$

where, $P_i$ is the injected active power of a $i^{th}$ bus, $Q_i$ is the injected reactive power of the $i^{th}$ bus, $V_i$ is the voltage magnitude of the $i^{th}$ bus, $V_j$ is the voltage magnitude of the $j^{th}$ bus, $\theta_{ij}$ is a voltage phase difference between the $i^{th}$ bus and a $j^{th}$ bus, $G_{ii}$ is a real part of a $i^{th}$ diagonal element in a bus admittance matrix, $B_{ii}$ is an imaginary part of the $i^{th}$ diagonal element in the bus admittance matrix, $G_{ij}$ is an real part of an element at a $i^{th}$ row and a $j^{th}$ column of the bus admittance matrix, $B_{ij}$ is an imaginary part of the element at the $i^{th}$ row and the $j^{th}$ column of the bus admittance matrix, j∈i represents that there is a branch between the $i^{th}$ bus and the $j^{th}$ bus; and where, $P_i = P_{Gi}^0 + P_{Li}^0 + \lambda(P_{Gi}^S + \gamma_i P_{Li}^S)$, $Q_i = Q_{Li}^0 + \lambda Q_{Li}^S$; $P_{Gi}^0$ is an initial active power vector of a generator, $P_{Li}^0$ is an initial active power of a load at the $i^{th}$ bus, $Q_{Li}^0$ is an initial reactive power of the load at the $i^{th}$ bus, $P_{Gi}^S$ is a power growth direction of the generator, $P_{Li}^S$ is an active power growth direction of the load at the $i^{th}$ bus, $Q_{Li}^S$, is a reactive power growth direction of the load at the $i^{th}$ bus, $\gamma_i$ is a loss allocation factor of the generator at the $i^{th}$ bus, $\lambda$ is a load growth factor and R is a real number set.

2. The method according to claim 1, wherein the group of flow power equations is simplified to be:

$f(x,\lambda)=0$, where, x is the voltage magnitude and the voltage phase of buses in the electric power system.

3. The method according to claim 2, wherein the parameterization variable is defined as $$t_\beta^k = \tan\beta^k = \frac{\lambda^k - \lambda^0}{V_l^k - V_l^0} = \frac{\lambda^k}{V_l^k - V_l^0},$$

where, $(V_l^0, \lambda^0)$ is a base power flow solution, $(V_l^k, \lambda^k)$ is the $k^{th}$ continuation power flow solution, $V_l^k$ is the voltage magnitude of the bus l having the fastest voltage drop in the $k^{th}$ continuation power flow solution, and β is an angle between an auxiliary line determined by points $(V_l^k, \lambda^k), (V_l^0, \lambda^0)$ and the vertical axis.

4. The method according to claim 3, wherein the parameterization variable $t_\beta^k$ meets a following relation:

$t_\beta^k = t_\beta^{k-1} + \Delta t_\beta$, where, $t_\beta^{k-1}$ is the parameterization variable in the $(k-1)^{th}$ iteration, $t_\beta^k$ is the parameterization variable in the $k^{th}$ iteration, and $$\Delta t_\beta = \frac{\lambda^1}{N(V_l^0 - V_l^1)}$$

is a growth step of the parameterization variable $t_\beta$, where, N is a non-zero number.

5. The method according to claim 4, wherein the collection of extended power flow equations are defined as:

$$\begin{cases} f(x, \lambda) = 0 \\ h(V_l, \lambda) = t_\beta^k(V_l - V_0) - \lambda = 0, \end{cases}$$

where, $h(V_l,\lambda)=0$ is the equality constraint equation.

6. The method according to claim 5, wherein the collection of extended power flow equations are solved by a Newton method and an iteration equation is used during solving the collection of extended power flow equations.

7. The method according to claim 6, wherein the iteration is stopped when the load growth factor λ is less than or equal to 0.

* * * * *